United States Patent [19]

Stevens

[11] Patent Number: 5,622,540
[45] Date of Patent: Apr. 22, 1997

[54] METHOD FOR BREAKING A GLASS SHEET

[75] Inventor: Harrie J. Stevens, Corning, N.Y.

[73] Assignee: Corning Incorporated, Corning, N.Y.

[21] Appl. No.: 308,276

[22] Filed: Sep. 19, 1994

[51] Int. Cl.$^6$ .................................... G03B 21/02
[52] U.S. Cl. .............. 65/112; 65/60.1; 83/879; 217/121.6
[58] Field of Search .............. 65/3.1, 111, 112, 65/60.1, 60.3, 473, DIG. 3, 61, 105; 219/121.6, 121.67, 121.68, 121.69, 121.72; 225/2, 1, 3, 4; 83/879, 880, 881, 882

[56] References Cited

U.S. PATENT DOCUMENTS

| | | | |
|---|---|---|---|
| 3,453,097 | 7/1969 | Hafner | 65/112 |
| 3,695,497 | 10/1972 | Dear | 225/2 |
| 4,544,395 | 10/1985 | Evans | 65/60.3 |
| 4,606,747 | 8/1986 | Steinhoff | 65/31 |
| 5,084,604 | 1/1992 | Dekker et al. | 219/121.72 |
| 5,154,334 | 10/1992 | Dekker et al. | 225/2 |
| 5,254,833 | 10/1993 | Okiyami | 219/121.68 |

FOREIGN PATENT DOCUMENTS

| | | |
|---|---|---|
| 4320341 | 12/1994 | Germany. |
| 4320341A1 | 12/1994 | Germany. |
| WO93/20015 | 10/1993 | WIPO ......................... 33/9 |

OTHER PUBLICATIONS

"Controlled Separation of Brittle Materials Using a Laser", written by R.M. Lumley, Western Electric Co., Engineering Research Center, published in the Ceramic Bulletin, vol. 48, No. 9 (1969), pp. 850–854.

Primary Examiner—Donald E. Czaja
Assistant Examiner—Calvin Padgett
Attorney, Agent, or Firm—Robert L. Carlson

[57] ABSTRACT

A glass breaking system is provided for breaking large sheets of glass into small sheets. A protective coating is applied to the glass sheet. A portion of the protective coating is then selectively removed, preferably by a laser beam, so that a portion of the surface of the coated side of the sheet is exposed. The glass sheet is then broken using laser separation techniques to break the glass sheet in the exposed area.

9 Claims, 1 Drawing Sheet

U.S. Patent     Apr. 22, 1997     5,622,540

METHOD FOR BREAKING A GLASS SHEET

FIELD OF THE INVENTION

The present invention relates to a method for breaking glass sheets, more particularly a method for protecting glass sheets during glass breaking operations.

BACKGROUND OF THE INVENTION

It is customary to produce flat glass as a continuous sheet, and to cut this continuous sheet into large glass sheet products. These large glass sheets are then commonly cut further to sizes needed for end products.

In the past, glass sheets were typically separated into smaller sheets by mechanically scoring the glass along an intended line of separation. The sheet was then bent underneath the scoreline to break the glass into separate sheets. This method produced a large number of glass chips, both during the scoring operation and when the glass sheet was bent and broken along the score line. For applications such as architectural and automotive glass which required relatively moderate dimensional and surface quality, such methods were sufficient.

However, glass sheets are now being utilized in applications which require higher dimensional and surface quality. One such application is flat panel displays, such as liquid crystal display (LCD) panels.

Various methods have been proposed to minimize the number of glass chips produced during glass breaking operations. In one method, the glass is mechanically scribed or abraded at the very edge of the glass sheet to form a crack initiation point. The crack is then drawn across the glass sheet using a laser along a desired line of separation. Such a process is further described, for example, in Patent Publication No. WO 93/20015, the specification of which is hereby incorporated by reference. The laser heats the glass, creating stresses within the glass sheet which cause the crack to propagate. By moving the laser, the crack is made to travel across the sheet. The laser can be used in conjunction with a water cooling stream or jet to improve this operation.

Such breaking processes can be achieved either with or without mechanical force to aid the breaking process. Because no mechanical scoring is utilized, the number of glass chips formed during the sheet breaking process is greatly reduced. In addition, the number of lateral cracks or flaws is also greatly reduced.

However, there is still a need to protect the glass sheets from water, dust, dirt, and any glass chips that are still inevitably formed during the glass breaking process. This is particularly true for glass sheets which are to be used in LCD and other flat panel displays. Glass sheets for LCD applications typically undergo further processing, after the breaking operations. This further processing requires as pristine a surface as possible.

SUMMARY OF THE INVENTION

One aspect of the present invention relates to a method for manufacturing flat glass sheets, in which at least one of the major surfaces of the glass sheet is covered with a layer of a protective material prior to the glass breaking operation. A portion of the protective material is then selectively removed by contact with a laser beam, either prior to or during the glass breaking operation. The protective layer may consist of virtually any material which is capable of being vaporized or otherwise selectively removed by contact with a laser beam.

The glass sheet is then contacted with a laser to separate the glass into two sections along a desired line of separation, the line of separation being located in the area where the protective layer was selectively removed. One such laser separation technique involves scoring or nicking the glass sheet at one edge to form a crack initiation point, and then using the laser to lead the crack across the glass sheet.

The protective layer is preferably an organic material. Preferred organic materials include those selected from the group consisting of polyethylene, polyester (such as polyethylene terephthalate), nylon, polypropylene, and copolymers thereof, such as polyethylene copolymers (,e.g., ethylene-vinyl acetate copolymer).

In one embodiment, a first pass of a laser beam across the glass sheet is used to selectively remove a portion of the protective layer, and a second pass of a laser beam is used to propagate or draw the crack across the glass sheet. The two passes can be achieved using the same laser or two separate lasers.

Alternatively, a single pass of a single laser beam may be used to both remove the protective layer and propagate the crack across the sheet. When a single pass of a laser is used, the selective removal of the protective layer and crack propagation occur simultaneously, or nearly simultaneously.

By covering the majority of the glass sheet prior to the glass breaking operation, the glass surface is protected from chips which might inadvertently occur during scribing or breaking operations, as well as any dirt or dust present in the surrounding atmosphere.

DETAILED DESCRIPTION OF THE INVENTION

The present invention relates to a system for breaking glass sheets along a desired line of separation. In the system of the present invention the majority of the surface of the glass sheet is protected during the glass breaking operation. Consequently, the present invention is useful for producing glass sheets which require nearly pristine surfaces, such as those used in liquid crystal and other flat panel displays.

Figure 1:
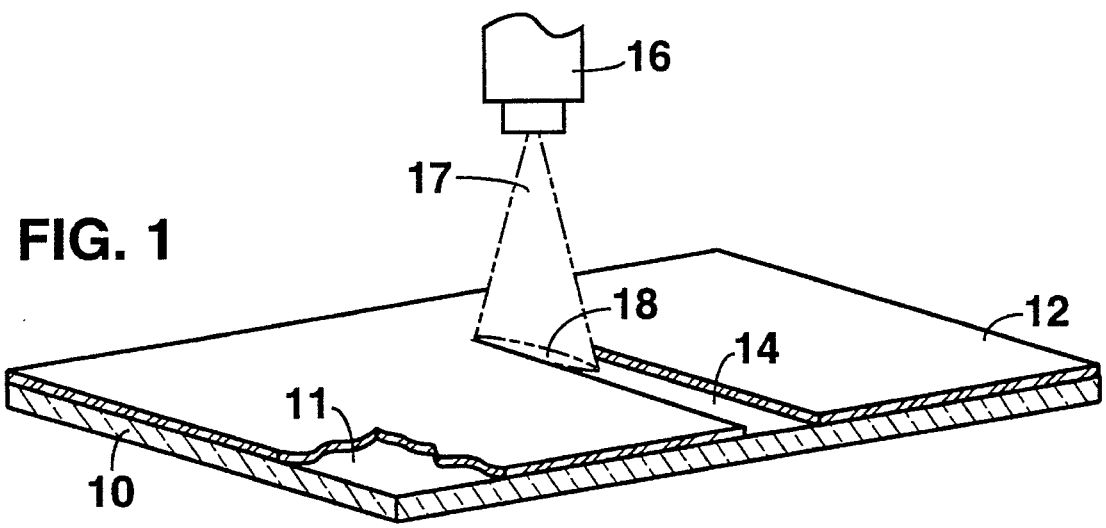
FIGS. 1 and 2 are partial schematic views illustrating a glass breaking operation in accordance with the present invention.

As illustrated in FIG. 1, in the glass breaking system of the present invention, glass sheet 10 has upper and lower major surfaces 11. At least one of the these major surfaces 11 is coated with a layer 12 of protective material prior to the glass sheet breaking operation.

The protective layer may consist of virtually any material -which is capable of being vaporized or otherwise selectively removed by contact with a laser beam. The protective layer is preferably an organic material. Preferred organic materials include those selected from the group consisting of polyethylene, polyester (such as polyethylene terephthalate), nylon, polypropylene, and copolymers thereof, such as polyethylene copolymers (e.g., ethylene-vinyl acetate copolymer). The protective layer is applied to the entire functional surface of the glass sheet, and a portion of this layer is removed prior to or simultaneous to utilizing the laser to separate the glass sheet.

Depending on the material that is chosen for the protective layer, it may be desirable to utilize an adhesive material to promote adhesion between the protective layer and the glass surface. One preferred family of adhesives is acrylic based adhesive materials.

The protective coating 12 can be applied to the glass surface, for example, by applying a film or layer of organic material which has been stored in roll or sheet form. The protective coating 12 may be applied to any form of glass sheet prior to a glass breaking operation. For example, protective coating 12 can be applied to a continuous glass sheet, such as that produced in a float glass process. Alternatively, the protective coating 12 can be applied to a large glass sheet prior to separating the sheet into smaller sheets. If applied to glass sheets which are to be separated into smaller sheets, the organic material may be cut to the size of the original sheet as it is applied to the surface thereof. Alternatively, the protective layer can be precut to size prior to application to the glass sheet.

In another embodiment, protective coating 12 is applied as a liquid which is curable by exposure to ultraviolet radiation. Such a liquid could be applied using conventional techniques for applying UV curable organic coatings, such as, for example, using a liquid applicating roller (not shown). After application of the liquid to the glass sheet, the liquid is cured by exposure to ultraviolet radiation, leaving a protective organic coating 12 on glass sheet 10.

In a preferred embodiment, a low density polyethylene protective layer is stored in roll form, and the roll is located above the glass. As the glass travels beneath the roll, the polyethylene layer 12 is unrolled and applied to the glass surface 11. The polyethylene layer is coated with an acrylic based adhesive material to promote adhesion to the glass sheet. The glass sheet 10 and the protective layer 12 are then squeezed between a pair of rollers (not shown) to promote adhesion of the protective layer to the glass.

After coating major surface 11 of glass sheet 10 with protective layer 12, a portion of protective coating 12 is selectively removed. In FIG. 1, this is accomplished using laser 16. Laser 16 directs a laser beam 17 which impinges on the glass sheet as beam spot 18. As laser 16 sweeps across glass sheet 10, the laser beam 17 vaporizes that portion of protective coating 12 that beam spot 18 contacts. In this way, an area of glass 14 is formed in which a portion of protective coating 12 is selectively removed. As illustrated, laser 16 has an elongated elliptical beam spot shape. However, other spot shapes could also be utilized.

After a portion of protective coating 12 has been selectively removed, glass sheet 10 is broken in the selectively removed area 14. In this way, most of the glass sheet is protected during the glass breaking operation.

Figure 2:
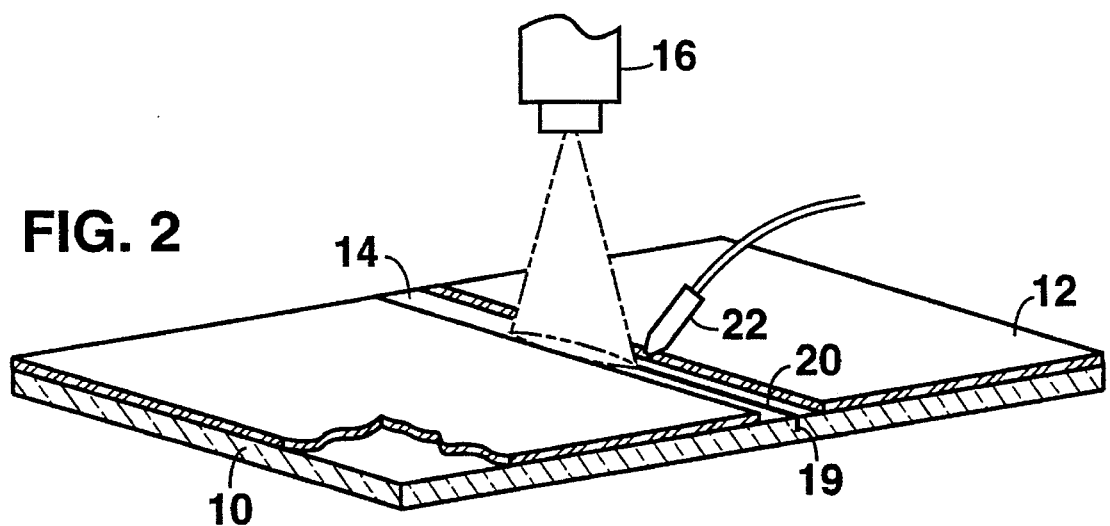

As illustrated in FIG. 2, glass sheet 10 is separated into smaller sheets using a laser separation technique. Glass sheet 10 is first nicked or scored along one edge of the glass sheet in selectively removed area 14 to form a crack initiation point 19 at one edge of the glass sheet 10. This crack initiation point 19 is then used to form crack 20, by a second movement of laser 16 across glass sheet 10 in the path of the desired line of separation. The laser effectively heats the glass sheet in a localized area along the desired line of separation. The resultant thermal expansion of the glass sheet in the localized heated area creates stress which forces the crack to propagate along the path traveled by the laser. If desired, water coolant can be applied through water jet 22 to enhance the stress distribution and thereby enhance crack propagation. By using the laser breaking technique rather than the more traditional methods which utilized mechanical scoring, many of the glass chips caused by mechanical scoring are avoided.

The laser beam used for the glass breaking operation should be able to heat the surface of the glass to be cut. Likewise, the laser beam used to remove the protective plastic layer should be capable of vaporizing the plastic material. Consequently, the laser radiation preferably is at a wavelength which can be absorbed by the glass and the plastic. For this to occur, the radiation should preferably be in the infra-red range, with a wavelength in excess of 2 µm, such as the beam of a $CO_2$ laser, with its wavelength of 9–11 µm; or a CO laser with its wavelength of 5–6 µm, or an HF laser with its wavelength of 2.6–3.0 µm, or an erbium YAG laser, with its wavelength of about 2.9 µm. As the surface of the material is being heated, its maximum temperature should not exceed the softening point of the material. If the softening point of the material is exceeded, residual thermal stresses may set in after the glass has cooled, resulting in cracking.

Crack 20 is formed in the glass down to the interface of the heated and cooled zones, that is in the area of the maximum thermal gradient. The depth, shape and direction of the crack are determined by the distribution of the thermoelastic stresses, which in turn are dependent primarily on the following several factors:

the power density, dimensions and shape of the beam spot;

the rate of relative displacement of the beam spot and the material;

the thermophysical properties, quality and conditions of supply of the coolant to the heated zone; and the thermophysical and mechanical properties of the material to be cracked, its thickness, and the state of its surface.

To optimize the cutting cycle for different materials, it is necessary to establish the proper relationship between the major parameters and variables of the cutting process.

As explained in PCT International Publication Number WO 93/20015, the specification of which is hereby incorporated by reference, depending on the dimension of the beam spot 18 and its spacing from the area on which the coolant stream falls, the speed V of the relative displacement of beam 16 across the glass 10, and the depth d of crack 20, are related by the expression:

$$V = k\, a(b+l)/d, \text{ where:}$$

v is the rate of relative displacement of the beam spot and of the material;

k is a proportionality factor dependant on the thermophysical properties of the material and the beam power density;

a is the width of the beam spot;

b is the length of the beam spot;

l is the distance from the rear edge of the beam spot to the front edge of the cooled zone, and d is the depth of the blind crack 4.

In determining the maximum power density of the laser beam employed for cutting the material, the maximum temperature of the surface layer of the material may not exceed its softening point. Thus, a minimum power density value of about $0.3 \times 10^6$ W/m$^2$ is acceptable for the lower-melting grades of thick glass at low thermal splitting speeds.

A larger power density value of, for example, $20 \times 10^6$ W/m$^2$ may be used to break high-melting quartz glass, corundum and other materials with either a high softening point or a high value of thermal conductivity.

Because the temperature of the surface of the glass 10 is directly dependent on the time of its exposure to laser beam 16, the use of a beam of elliptical instead of circular cross-section extends the time of the heating of each point on the surface of the glass 10 along the cutting line for the same rate of relative displacement. Hence, with a set power density for laser beam 16, and with the same distance from the laser beam spot to the front edge of the coolant spot, which is essential for maintaining the required depth of heating of the glass 10, the greater the laser beam spot is extended in the displacement direction, the greater will be the allowable rate of the relative displacement of the laser beam spot and material.

In a preferred embodiment, crack 20 only extends partially into the depth of glass sheet 10. Final separation of the glass sheet into smaller sheets is preferably achieved by applying a bending movement under crack 20. Such bending can be accomplished using conventional bending apparatus (not shown) and techniques such as are used to break glass sheets in processes which utilize surface scoring. Because crack 20 is formed using the laser glass breaking technique, rather than a mechanical scoring technique, the formation of glass chips during the mechanical breaking step its greatly minimized compared to past techniques.

In the process illustrated in FIGS. 1 and 2, the glass breaking operation involves two passes of a single laser 16, a first pass for selective removal of protective coating 12 in region 14, and a second pass for propagating crack 20. The power of laser 16 may be adjusted to be different for each of these passes, if desired. Alternatively, two lasers could be utilized, a first laser utilized to selectively remove a portion of the protective layer 12, and a second laser utilized to propagate crack 20 across the glass sheet. Thus, laser 16 in FIG. 2 may or may not be the same laser as laser 16 in FIG. 1.

Figure 3:
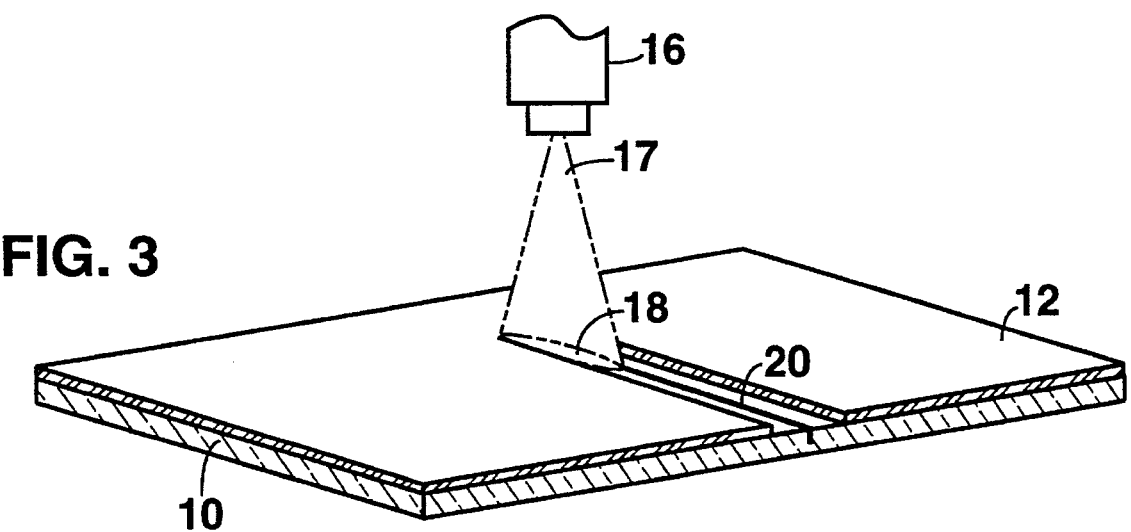
FIG. 3 is a partial schematic view illustrating of an alternative glass breaking operation in accordance with the present invention.

In the preferred embodiment, illustrated in FIG. 3, a single pass of a single laser 16 is utilized to simultaneously perform both the selective removal of the coating and crack propagation function (and hence laser 16 is not utilized). As illustrated in FIG. 3, laser 16 emits radiation which impinges on the surface of glass sheet 10, preferably in the shape of a narrow ellipse. Because a portion of this ellipse extends on both sides of crack 20, a portion of protective layer 12 will be vaporized and removed on each side of crack 20. At the same time, the movement of the laser 16 propagates crack 20 across glass sheet 10. The width of protective layer 12 removed is roughly equivalent to the width of the ellipse. Preferably, application of the laser results in the removal of a strip of protective layer about 1–2 mm wide on each side of the desired path of crack propagation.

In the preferred embodiment of the invention, a system controller, such as a digital computer (not shown) is operatively connected to the system to control movement of the laser and/or the glass sheet, as well as other moving parts on the system, the system controller utilizes conventional machine control techniques to control movement of the various components of the system. Preferably, the system controller utilizes various production operating programs stored in its memory, each program designed to appropriately control movement of the laser or glass sheet (and other moving parts, if necessary) for a particular size glass sheet.

The following examples, which are intended to be illustrative rather than limiting, demonstrate methods in accordance with the present invention.

EXAMPLES

In these examples, glass sheets were first coated with a layer of protective material. A portion of the protective material was selectively removed, and the sheets separated into smaller sheets using the laser breaking operation described above.

Glass sheets approximately 400 mm wide by 400 mm long by 1.1 mm thick were coated with a layer of LFC-3 masking film, manufactured by Maine Tape Corporation. LFC-3 is a polyethylene film material, approximately 0.002 inches thick, stored in roll form and has an acrylic adhesive on one side. The film was applied to glass so that the adhesive contacted the glass sheet, and the coated glass was then squeezed between a pair of rollers to promote adhesion of the film to the glass sheet.

The plastic coating was selectively removed and the glass sheets separated into smaller sheets using the following two processes.

EXAMPLE 1 in this example, a single $CO_2$ laser 16 was used to both selectively remove a portion of protective layer 12 and separate glass sheet 10 into smaller sheets. Protective layer 12 was selectively removed using first pass of laser 16, and glass sheet 10 was separated into smaller sheets using a second pass of laser 16.

Laser 16 was an axial flow dual beam $CO_2$ laser, Model 1200, manufactured by PRC Corporation of North Frontage Road, Landing, N.J. 07850. The beam had a spot size (the area of the laser beam where it exits the laser) of 3.14 cm$^2$, and was operated at approximately 70 W, resulting in a beam power density of about 22 W/cm$^2$. The laser was located about 2 meters from the protective layer on the glass surface. A pair of cylindrical lenses were located in the path of the laser, between the laser and the glass surface, to shape the laser spot. This resulted in a laser spot shape, where the laser impinged on the protective layer, which was elongated and somewhat elliptical, about 3.3 cm long and 2 mm wide at its midpoint.

The glass was moved under laser 16 at a speed of about 250 mm/min. Laser 16 successfully vaporized all of the protective layer 12 (and the adhesive) it contacted, resulting in the selective removal of protective layer 12, and the production of a removed strip 14 approximately 2 mm wide. The area where the protective layer 12 was removed showed no remaining residue, and the ability to peal away the remainder of protective layer 12 was not compromised.

Glass sheet 10 was manually scribed on the edge of the glass sheet to form a crack initiation point 19. The glass was scored in the area 14 where the protective layer had been selectively removed. This created a crack initiation point 19 in the form of a small score line, approximately 8 mm long and approximately 0.1 mm deep, at one edge on the top surface of the glass. Glass sheet 10 was positioned so that laser 16 contacted the crack initiation point 19, and the glass sheet 10 was moved so that the path of laser 16 followed the same path of the first sweep of laser 16. Consequently, laser 16 traveled within the selectively removed portion 14 of protective layer 12. Glass sheet 10 was moved at a speed of about 250 mm/min. The laser effectively heated the glass in areas where the laser impinged on the glass surface. As a result of the localized heating caused by the laser, a crack propagated across the glass surface, starting from crack initiation point 19 and continuing along the path followed by the laser 16. This crack was approximately 0.1 mm deep. Pressure was then manually applied to the glass sheet to apply a bending moment to the laser generated crack, causing the glass sheet 10 to separate into two sheets.

Using this technique, the laser generated crack acts much like the score line produced using mechanical scoring techniques. However, using the laser technique, the formation of glass chips inherent with mechanical scoring techniques is largely avoided.

Although in this example laser 16 traveled across glass sheet 10 at about 250 mm/min., a wide range of speeds are possible. For example, glass speeds of 150 mm–450 mm/min were successfully achieved using laser power settings between about 50–80 watts. It is believed that even higher speeds could be achieved by increasing the laser beam power density further.

EXAMPLE 2

In this example, a single pass of a laser is utilized to both burn off the protective layer and propagate the crack across the glass sheet. The same apparatus and laser described in Example 1 was utilized, except that the power of the laser was increased to about 80 watts, resulting in a beam density of about 25.47 W/cm$^2$. This slightly higher power effectively burned the protective layer and score the glass sheet in one pass.

Prior to contacting glass sheet 10 with laser beam 17, glass sheet 10 was manually scribed on the edge of the glass sheet to form a crack initiation point 19. Laser 16 was then aligned with crack initiation point 19 and the glass sheet moved at a speed of about 250 mm/min., so that the laser traveled across glass sheet 10 in a desired line of separation. The laser effectively removed a strip of protective layer 12 which was about 2 mm wide. At the same time, the laser caused crack initiation point 19 to propagate in the form of a partial crack 20 across glass sheet 10. The crack 20 was about 0.1 mm deep. The breaking of glass sheet 10 was then completed by manually bending glass as in Example 1.

In both Examples described above, the glass sheets were separated into smaller sheets with no visible evidence of any glass Chip production. At the same time, the remainder of the surface of the glass was protected by protective layer 12.

Although the invention has been described in detail for the purpose of illustration, it is understood that such detail is solely for that purpose and variations can be made therein by those skilled in the art, without departing from the spirit and scope of the invention, which is defined by the following claims.

I claim:

1. A method for manufacturing flat glass sheets comprising the steps of:
   providing a flat glass sheet having two major surfaces;
   covering at least one of said major surfaces with a protective layer of organic material; and
   sweeping a laser over said glass sheet in a single pass to:
   selectively remove a portion of said protective layer, thereby forming, on said at least one major surface, a covered region and a non-covered region; and
   form a crack in the glass sheet along a desired line of separation in said non-covered region.

2. The method of claim 1, wherein said forming a crack step comprises utilizing a laser to form a crack across said glass sheet, and said crack extends only partially into the depth of said glass sheet.

3. The method of claim 1, further comprising, prior to said forming step, abrading the glass on one of said major surfaces to form a crack initiation point, and said forming a crack step comprises contacting said glass sheet with a laser beam at said crack initiation point and moving said laser beam along said desired line of separation.

4. The method of claim 1, wherein said removing step comprises sweeping a laser over said sheet of glass to selectively remove said protective layer to form said non-covered region.

5. The method of claim 1, wherein said step of sweeping a laser comprises utilizing a first pass and a second pass of a single laser, the first pass selectively removing said protective layer, the second pass forming said crack.

6. The method of claim 1, wherein said removing step comprises sweeping a first laser over said sheet of glass to selectively remove a portion of said protective layer, and said forming a crack step comprises contacting a second laser with said glass in said non-covered region.

7. The method of claim 1, further comprising, after said forming step bending said sheet to separate said sheet into two smaller sheets along said crack.

8. The method of claim 4, wherein during said removing step, said laser vaporizes said portion of said protective layer which is removed.

9. The method of claim 1, wherein said organic material is selected from the group consisting of polyethylene, polyester, nylon, polypropylene.

* * * * *